US011660742B2

(12) United States Patent
Kinoshita et al.

(10) Patent No.: US 11,660,742 B2
(45) Date of Patent: May 30, 2023

(54) TEACHING METHOD AND ROBOT SYSTEM

(71) Applicant: SEIKO EPSON CORPORATION, Tokyo (JP)

(72) Inventors: Hirofumi Kinoshita, Matsumoto (JP); Kaoru Takeuchi, Azumino (JP); Hiroki Adachi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 111 days.

(21) Appl. No.: 17/161,714

(22) Filed: Jan. 29, 2021

(65) Prior Publication Data

US 2021/0237261 A1 Aug. 5, 2021

(30) Foreign Application Priority Data

Jan. 31, 2020 (JP) .............................. JP2020-014615

(51) Int. Cl.
*B25J 9/16* (2006.01)
*B25J 13/08* (2006.01)
*B25J 9/00* (2006.01)
*G05B 19/423* (2006.01)

(52) U.S. Cl.
CPC ........... *B25J 9/0081* (2013.01); *B25J 9/1651* (2013.01); *B25J 13/085* (2013.01); *G05B 19/423* (2013.01); *G05B 2219/36425* (2013.01); *G05B 2219/36489* (2013.01)

(58) Field of Classification Search
CPC ........ B25J 9/0081; B25J 9/1651; B25J 9/085; G05B 19/423; G05B 2219/36425; G05B 2219/36489; G05B 2219/40225; G05B 19/42; G05B 2219/36401; G05B 2219/39343; G05B 2219/39332; G05B 2219/39329; G05B 2219/39325;

(Continued)

(56) References Cited

U.S. PATENT DOCUMENTS 4,791,588 A 12/1988 Onda et al.
5,912,540 A * 6/1999 Kosaka .................. B25J 9/1674
318/568.14

(Continued)

FOREIGN PATENT DOCUMENTS

| CN | 108667363 A | 10/2018 |
| JP | S6145311 A | 11/1980 |
| JP | 2008110406 A | 5/2008 |

OTHER PUBLICATIONS

Collins, D. (May 2, 2017). How to reduce jerk in linear motion systems. Linear Motion Tips. Retrieved Sep. 28, 2022, from archive https://web.archive.org/web/20170701032503/https://www.linearmotiontips.com/how-to-reduce-jerk-in-linear-motion-systems/ (Year: 2017).*

*Primary Examiner* — Dale Moyer
(74) *Attorney, Agent, or Firm* — Yu Gang

(57) ABSTRACT

A teaching method for detecting external force applied to a robot arm, driving the robot arm with force control based on the external force, and teaching a position and a posture of the robot arm, the teaching method including gradually relaxing, according to an elapsed time from when operation of the robot arm is started or a movement amount of the robot arm from when the operation of the robot arm is started, a restrictive condition for restricting the driving of the robot arm.

4 Claims, 6 Drawing Sheets

(58) Field of Classification Search
CPC ........... G05B 2219/39323; G05B 2219/39319; G05B 2219/39321; G05B 2219/42092
USPC ................................... 901/1, 4; 318/568.14
See application file for complete search history.

(56) References Cited

U.S. PATENT DOCUMENTS

| | | | |
|---|---|---|---|
| 2002/0161477 A1* | 10/2002 | Doi | G05B 19/4067 700/264 |
| 2011/0208356 A1* | 8/2011 | Kato | B25J 9/163 700/253 |
| 2018/0029221 A1* | 2/2018 | Tanaka | B25J 15/0253 |

* cited by examiner

TEACHING METHOD AND ROBOT SYSTEM

The present application is based on, and claims priority from JP Application Serial Number 2020-014615, filed Jan. 31, 2020, the disclosure of which is hereby incorporated by reference herein in its entirety.

BACKGROUND

1. Technical Field

The present disclosure relates to a teaching method and a robot system.

2. Related Art

For example, as described in JP-A-2008-110406 (Patent Literature 1), there has been known a direct teaching device that directly teaches a robot based on force control. The direct teaching device detects force applied to a robot arm and stores the position and the posture of the robot arm while driving the robot arm based on the detected force.

In the direct teaching device described in Patent Literature 1, a viscosity coefficient, which is one of force control parameters, is changed according to an operation state of the robot arm. Consequently, operation in moving the robot arm from a stop state is smoothed and operability is improved.

However, in the direct teaching device described in Patent Literature 1, since the operation in moving the robot arm from the stop state is smoothed, it is likely that the speed of the robot arm is higher than expected, which deteriorates the operability.

SUMMARY

A teaching method according to an aspect of the present disclosure is a teaching method for detecting external force applied to a robot arm, driving the robot arm with force control based on the external force, and teaching a position and a posture of the robot arm, the teaching method including gradually relaxing, according to an elapsed time from when operation of the robot arm is started or a movement amount of the robot arm from when the operation of the robot arm is started, a restrictive condition for restricting the driving of the robot arm.

A robot system according to an aspect of the present disclosure includes: a robot including a robot arm; a force detecting section configured to detect external force applied to the robot arm; a storing section configured to store a position and a posture of the robot arm; and a control section configured to drive the robot arm with force control based on the external force and execute teaching for storing the position and the posture of the robot arm in the storing section. The control section gradually relaxes, according to an elapsed time from when operation of the robot arm is started or a movement amount of the robot arm from when the operation of the robot arm is started, a restrictive condition for restricting the driving of the robot arm.

DESCRIPTION OF EXEMPLARY EMBODIMENTS

First Embodiment

Figure 1:
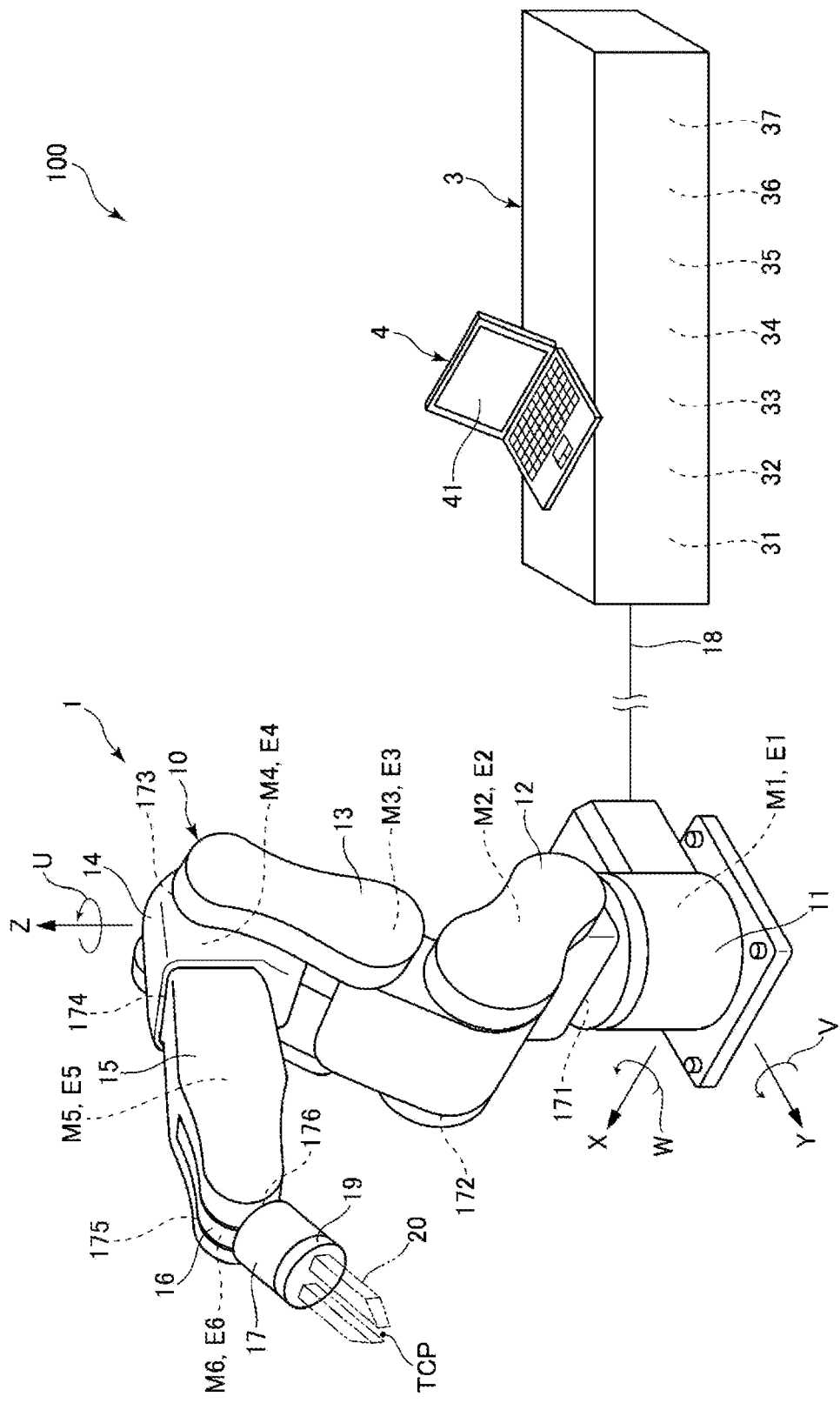
FIG. 1 is a diagram showing an overall configuration of a robot system in a first embodiment.
Figure 2:
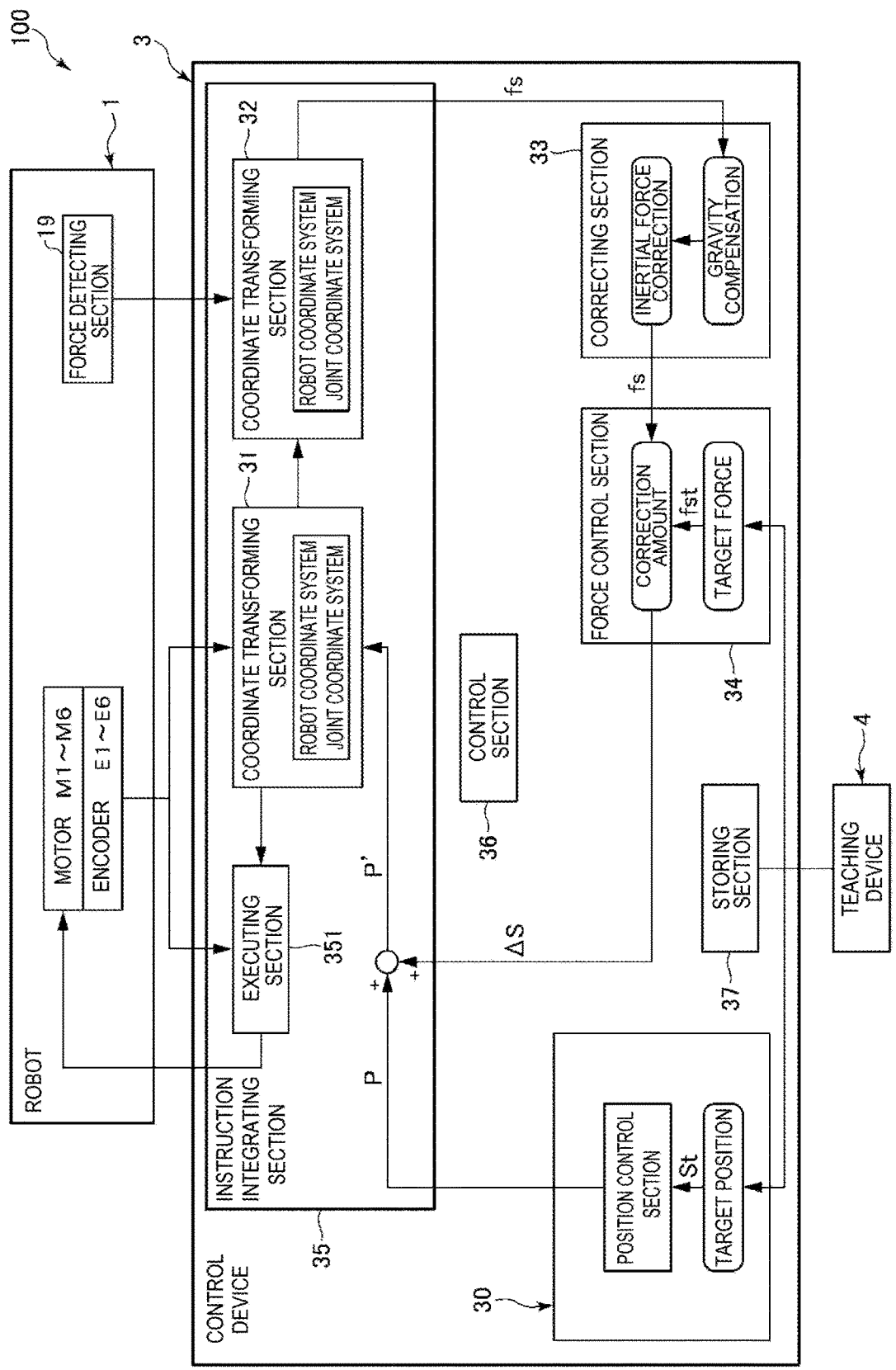
FIG. 2 is a block diagram of the robot system shown in FIG. 1.

FIG. 1 is a diagram showing an overall configuration of a robot system in a first embodiment. FIG. 2 is a block diagram of the robot system shown in FIG. 1. FIGS. 3 to 6 are graphs for explaining examples of calibration curves indicating relationship between upper limit speed of a robot arm and time. FIG. 7 is a flowchart for explaining a control operation performed by a control device shown in FIG. 2.

A teaching method and a robot system according to the present disclosure are explained in detail below based on a preferred embodiment shown in the accompanying drawings. In the following explanation, for convenience of explanation, a +Z-axis direction in FIG. 1, that is, the upper side is referred to "upper" as well and a −Z-axis direction in FIG. 1, that is, the lower side is referred to as "lower" as well. Concerning the robot arm, a base 11 side in FIG. 1 is referred to as "proximal end" as well and the opposite side of the base 11 side, that is, an end effector 20 side is referred to as "distal end" as well. A Z-axis direction in FIG. 1, that is, the up-down direction is represented as "vertical direction" and an X-axis direction and a Y-axis direction in FIG. 1, that is, the left-right direction is represented as "horizontal direction".

As shown in FIG. 1, a robot system 100 includes a robot 1, a control device 3 that controls the robot 1, and a teaching device 4. The robot system 100 executes the teaching method according to the present disclosure.

Teaching means designating an operation program to the robot 1 and specifically means inputting and storing the position and the posture of a robot arm 10 in the control device 3 or the teaching device 4. In the present disclosure, the robot arm 10 is actually driven based on an operation instruction from an operator. In a process of the driving, transition of the position and the posture of the robot arm 10 is stored at least once. Timing for storing the position and the posture of the robot arm 10 may be timing when a not-shown teaching button is operated or may be predetermined time.

During the teaching, the operator can move the robot arm 10 by applying external force to the robot arm 10 and can drive the robot arm 10 by operating the robot arm 10 using the teaching device 4 or other controllers. That is, the operation instruction received by the robot arm 10 during the teaching means the external force received from the operator.

The teaching by the operator for moving the robot arm 10 by applying external force to the robot arm 10 is referred to as direct teaching. On the other hand, teaching by the operator for moving the robot arm 10 by operating the teaching device 4 or other controllers is referred to as indirect teaching. The teaching method according to the present disclosure is applied when the direct teaching is performed.

First, the robot 1 is explained.

The robot 1 shown in FIG. 1 is a single-arm six-axis vertical articulated robot in this embodiment and includes a base 11 and the robot arm 10. An end effector 20 can be attached to the distal end portion of the robot arm 10. The end effector 20 may be a component of the robot 1 or may not be a component of the robot 1.

The robot 1 is not limited to the illustrated configuration and may be, for example, a double-arm articulated robot. The robot 1 may be a horizontal articulated robot.

The base 11 is a supporting body that supports the robot arm 10 from the lower side to be able to be driven and is fixed to, for example, a floor in a factory. In the robot 1, the base 11 is electrically coupled to the control device 3 via a relay cable 18. The coupling of the robot 1 and the control device 3 is not limited to coupling by wire in the configuration shown in FIG. 1 and may be, for example, coupling by radio. Further, the robot 1 and the control device 3 may be coupled via a network such as the Internet.

In this embodiment, the robot arm 10 includes a first arm 12, a second arm 13, a third arm 14, a fourth arm 15, a fifth arm 16, and a sixth arm 17. These arms are coupled in this order from the base 11 side. The number of arms included in the robot arm 10 is not limited to six and many be, for example, one, two, three, four, five, or seven or more. The sizes such as the total lengths of the arms are not respectively particularly limited and can be set as appropriate.

The base 11 and the first arm 12 are coupled via a joint 171. The first arm 12 is capable of turning with respect to the base 11 around a first turning axis parallel to the vertical direction with the first turning axis as a turning center. The first turning axis coincides with the normal of a floor to which the base 11 is fixed.

The first arm 12 and the second arm 13 are coupled via a joint 172. The second arm 13 is capable of turning with respect to the first arm 12 with a second turning axis parallel to the horizontal direction as a turning center. The second turning axis is parallel to an axis orthogonal to the first turning axis.

The second arm 13 and the third arm 14 are coupled via a joint 173. The third arm 14 is capable of turning with respect to the second arm 13 with a third turning axis parallel to the horizontal direction as a turning center. The third turning axis is parallel to the second turning axis.

The third arm 14 and the fourth arm 15 are coupled via a joint 174. The fourth arm 15 is capable of turning with respect to the third arm 14 with a fourth turning axis parallel to the center axis direction of the third arm 14 as a turning center. The fourth turning axis is orthogonal to the third turning axis.

The fourth arm 15 and the fifth arm 16 are coupled via a joint 175. The fifth arm 16 is capable of turning with respect to the fourth arm 15 with a fifth turning axis as a turning center. The fifth turning axis is orthogonal to the fourth turning axis.

The fifth arm 16 and the sixth arm 17 are coupled via a joint 176. The sixth arm 17 is capable of turning with respect to the fifth arm 16 with a sixth turning axis as a turning center. The sixth turning axis is orthogonal to the fifth turning axis.

The sixth arm 17 is a robot distal end portion located on the most distal end side in the robot arm 10. The sixth arm 17 can turn together with the end effector 20 according to the driving of the robot arm 10.

The robot 1 includes a motor M1, a motor M2, a motor M3, a motor M4, a motor M5, and a motor M6 functioning as driving sections and an encoder E1, an encoder E2, an encoder E3, an encoder E4, an encoder E5, and an encoder E6. The motor M1 is incorporated in the joint 171 and relatively rotates the base 11 and the first arm 12. The motor M2 is incorporated in the joint 172 and relatively rotates the first arm 12 and the second arm 13. The motor M3 is incorporated in the joint 173 and relatively rotates the second arm 13 and the third arm 14. The motor M4 is incorporated in the joint 174 and relatively rotates the third arm 14 and the fourth arm 15. The motor M5 is incorporated in the joint 175 and relatively rotates the fourth arm 15 and the fifth arm 16. The motor M6 is incorporated in the joint 176 and relatively rotates the fifth arm 16 and the sixth arm 17.

The encoder E1 is incorporated in the joint 171 and detects the position of the motor M1. The encoder E2 is incorporated in the joint 172 and detects the position of the motor M2. The encoder E3 is incorporated in the joint 173 and detects the position of the motor M3. The encoder E4 is incorporated in the joint 174 and detects the position of the motor M4. The encoder E5 is incorporated in the joint 175 and detects the position of the motor M5. The encoder E6 is incorporated in the joint 176 and detects the position of the motor M6.

The encoders E1 to E6 are electrically coupled to the control device 3. Position information, that is, rotation amounts of the motors M1 to M6 are transmitted to the control device 3 as electric signals. The control device 3 drives the motors M1 to M6 via a not-shown motor driver based on this information. That is, controlling the robot arm 10 means controlling the motors M1 to M6.

In the robot 1, a force detecting section 19 that detects force is detachably set in the robot arm 10. The robot arm 10 can be driven in a state in which the force detecting section 19 is set. In this embodiment, the force detecting section 19 is a six-axis force sensor. The force detecting section 19 detects the magnitudes of forces on three detection axes orthogonal to one another and the magnitudes of torques around the three detection axes. That is, the force detecting section 19 detects force components in the axial directions of an X axis, a Y axis and a Z axis orthogonal to one another, a force component in a W direction around the X axis, a force component in a V direction around the Y axis, and a force component in a U direction around the Z axis. In this embodiment, the Z-axis direction is the vertical direction. The force components in the axial directions can also be referred to as "translational force components". The force components around the axes can also be referred to as "torque components". The force detecting section 19 is not limited to the six-axis force sensor and may be sensors having other configurations.

In this embodiment, the force detecting section 19 is set in the sixth arm 17. A setting part of the force detecting section 19 is not limited to the sixth arm 17, that is, an arm located on the most distal end side and may be, for example, another arm or a part between adjacent arms.

The end effector 20 can be detachably attached to the force detecting section 19. The end effector 20 has a function of performing holding, suction, screwing, and the like. In the robot system 100, in a robot coordinate system, a tool center point TCP is set at the distal end of the end effector 20.

The operation of such a robot 1 is controlled by the control device 3.

The control device 3 and the teaching device 4 are explained.

The control device 3 is disposed away from the robot 1. The control device 3 can be configured by a computer or the like in which a CPU (Central Processing Unit), which is an example of a processor, is incorporated. The control device 3 may be incorporated in the base 11 of the robot 1.

The control device 3 is communicably coupled to the robot 1 by the relay cable 18. The control device 3 and the teaching device 4 are coupled by a cable or wirelessly communicably coupled. The teaching device 4 may be a dedicated computer or may be a general-purpose computer in which a program for teaching the robot 1 is installed. For example, a teaching pendant, which is a dedicated device for teaching the robot 1, may be used instead of the teaching device 4. Further, the control device 3 and the teaching device 4 may include separate housings as shown in FIG. 1 or may be integrally configured.

In the teaching device 4, a teaching program for generating an execution program, which has a target position $S_t$ and a target force $f_{St}$ explained below as arguments, and loading the execution program to the control device 3 is installed. The teaching device 4 includes a display 41, a processor, a RAM, and a ROM. These hardware resources generate the execution program in cooperation with the teaching program.

As shown in FIG. 2, the control device 3 is a computer in which a control program for performing control of the robot 1 is installed. The control device 3 includes a processor and a not-shown RAM and a not-shown ROM. These hardware resources control the robot 1 in cooperation with a program.

As shown in FIG. 2, the control device 3 includes a position control section 30, a coordinate transforming section 31, a coordinate transforming section 32, a correcting section 33, a force control section 34, an instruction integrating section 35, a restricting section 36, and a storing section 37.

The position control section 30 generates, according to a target position designated by a command created in advance, a position instruction signal, that is, a position instruction value for controlling the position of the tool center point TCP of the robot 1.

The control device 3 is capable of controlling the operation of the robot 1 with force control or the like. The "force control" means control of the operation of the robot 1 for changing, based on a detection result of the force detecting section 19, the position of the end effector 20, that is, the position of the tool center point TCP and the postures of the first to sixth arms 12 to 17. In this embodiment, it is assumed that, when teaching is performed, the teaching is direct teaching for performing the force control.

The force control includes, for example, force trigger control and impedance control.

In the force trigger control, force detection is performed by the force detecting section 19. The robot arm 10 is caused to perform operation for changing movement and a posture until a predetermined force is detected by the force detecting section 19.

The impedance control includes tracer control. First, to briefly explain, in the impedance control, the operation of the robot arm 10 is controlled to maintain force applied to the distal end portion of the robot arm 10 at the predetermined force as much as possible, that is, maintain force in a predetermined direction detected by the force detecting section 19 at the target force $f_{St}$ as much as possible. Consequently, for example, when the impedance control is performed on the robot arm 10, the robot arm 10 performs a tracing operation in the predetermined direction for tracing external force applied from a target object or the operator. The target force $f_{St}$ includes 0. For example, in the case of the tracing operation, a target value can be set to "0". The target force $f_{St}$ can be set to a numerical value other than 0. The operator can set the target force $f_{St}$ as appropriate.

The control device 3 store a correspondence relation between a combination of rotation angles of the motors M1 to M6 and the position of the tool center point TCP in the robot coordinate system. The control device 3 stores, for each of processes of work performed by the robot 1, at least one of the target position $S_t$ and the target force $f_{St}$ based on a command. A command having the target position $S_t$ and the target force $f_{St}$ as arguments, that is, parameters is set for each of the processes of the work performed by the robot 1.

The control device 3 controls the first to sixth arms 12 to 17 based on the command such that the set target position $S_t$ and the set target force $f_{St}$ are matched in the tool center point TCP. The target force $f_{St}$ is force that should be detected by the force detecting section 19 according to the operations of the first to sixth arms 12 to 17. It is assumed that the character "S" represents any one direction of directions (X, Y, Z, U, V, and W) of an axis specifying the robot coordinate system. It is assumed that S represents the position in an S direction as well. For example, in the case of S=X, an X-direction component of a target position set in the robot coordinate system is $S_t=X_t$ and an X-direction component of a target force is $f_{St}=f_{Xt}$.

In the control device 3, when rotation angles of the motors M1 to M6 are acquired, the coordinate transforming section 31 shown in FIG. 2 transforms, based on the correspondence relation, the rotation angles into the position S (X, Y, Z, V, W, and U) of the tool center point TCP in the robot coordinate system. The coordinate transforming section 32 specifies, based on the position S of the tool center point TCP and a detection value of the force detecting section 19, in the robot coordinate system, an acting force $f_S$ actually acting on the force detecting section 19.

A point of action of the acting force $f_S$ is defined as an origin separately from the tool center point TCP. The origin corresponds to a point where the force detecting section 19 detects force. The control device 3 stores, for each position S of the tool center point TCP in the robot coordinate system, a correspondence relation specifying a direction of a detection axis in a sensor coordinate system of the force detecting section 19. Therefore, the control device 3 can specify the acting force $f_S$ in the robot coordinate system based on the position S of the tool center point TCP in the robot coordinate system and the correspondence relation. Torque acting on the robot can be calculated from the acting force $f_S$ and the distance from a contact point to the force detecting section 19 and is specified as a torque component.

The correcting section 33 performs gravity compensation for the acting force $f_S$. The gravity compensation means removing components of force and torque due to the gravity from the acting force $f_S$. The acting force $f_S$ for which the gravity compensation is performed can be regarded as force other than the gravity acting on the robot arm 10 or the end effector 20.

The correcting section 33 performs inertia compensation for the acting force $f_S$. The inertia compensation means removing components of force and torque due to an inertial force from the acting force $f_S$. The acting force $f_S$ for which the inertia compensation is performed can be regarded as force other than the inertial force acting on the robot arm 10 or the end effector 20.

The force control section 34 performs the impedance control. The impedance control is active impedance control for realizing virtual mechanical impedance with the motors M1 to M6. The control device 3 executes such impedance control when performing processes in a contact state in which the end effector 20 receives force from a workpiece, which is a target object, such as fitting work, screwing work, and polishing work for the workpiece and the direct teaching. In processes other than such processes, safety can be improved by, for example, performing the impedance control when a person touches the robot 1.

In the impedance control, the target force $f_{St}$ is substituted in an equation of motion explained below to derive rotation angles of the motors M1 to M6. Signals for the control device 3 to control the motors M1 to M6 are PWM (Pulse Width Modulation)-modulated signals. A mode for deriving the rotation angles from the target force $f_{St}$ based on the equation of motion and controlling the motors M1 to M6 is referred to as force control mode.

In a process in a noncontact state in which the end effector 20 does not receive external force, the control device 3 controls the motors M1 to M6 at rotation angles derived by a linear arithmetic operation from the target position $S_t$. A mode for controlling the motors M1 to M6 at the rotation angles derived by the linear arithmetic operation from the target position $S_t$ is referred to as position control mode.

The control device 3 specifies a force-derived correction amount $\Delta S$ by substituting the target force $f_{St}$ and the acting force $f_S$ in the equation of motion of the impedance control. The force-derived correction amount $\Delta S$ means the size of a position S to which the tool center point TOP should move in order to eliminate a force deviation $\Delta f_S(t)$ from the target force $f_{St}$ when the tool center point TCP receives mechanical impedance. The following Expression (1) is the equation of motion of the impedance control.

$$m\Delta \ddot{S}(t)+d\Delta \dot{S}(t)+k\Delta S(t)=\Delta f_S(t) \quad (1)$$

The left side of Expression (1) is formed by a first term obtained by multiplying a second-order differential value of the position S of the tool center point TOP by a virtual mass coefficient m (hereinafter, referred to as "mass coefficient m"), a second term obtained by multiplying a differential value of the position S of the tool center point TOP by a virtual viscosity coefficient d (hereinafter referred to as "viscosity coefficient d"), and a third term obtained by multiplying the position S of the tool center point TOP by a virtual modulus of elasticity k (hereinafter referred to as "modulus of elasticity k"). The right side of Expression (1) is formed by the force deviation $\Delta f_S(t)$ obtained by subtracting an actual force f from the target force $f_{St}$. Differential in Expression (1) means differential by time. In the process performed by the robot 1, a fixed value is set as the target force $f_{St}$ in some cases and a function of time is set as the target force $f_{St}$ in other cases.

The mass coefficient m means mass that the tool center point TCP virtually has. The viscosity coefficient d means viscosity resistance that the tool center point TCP virtually receives. The modulus of elasticity k means a spring constant of an elastic force that the tool center point TCP virtually receives.

As a value of the mass coefficient m increases, acceleration of a motion decreases. As the value of the mass coefficient m decreases, the acceleration of the motion increases. As a value of the viscosity coefficient d increases, the speed of the motion decreases. As the value of the viscosity coefficient d decreases, the speed of the motion increases. As a value of the modulus of elasticity k increases, a spring property increases. As the value of the modulus of elasticity k decreases, the spring property decreases.

In this specification, each of the mass coefficient m, the viscosity coefficient d, and the modulus of elasticity k is referred to as force control parameter. The mass coefficient m, the viscosity coefficient d, and the modulus of elasticity k may be set to different values for each of directions or may be set to common values irrespective of the directions. The operator can set the mass coefficient m, the viscosity coefficient d, and the modulus of elasticity k as appropriate before work.

As explained above, in the robot system 100, a correction amount is calculated from the detection value of the force detecting section 19, the force control parameters set in advance, and the target force set in advance. The correction amount means the force-derived correction amount $\Delta S$ and means a difference between a position where external force is received and a position to which the tool center point TCP should be moved.

The instruction integrating section 35 adds the force-derived correction amount $\Delta S$ to the position instruction value P generated by the position control section 30. By performing this addition at any time, the instruction integrating section 35 calculates a new position instruction value P' from the position instruction value P used for moving the tool center point TCP to the point where the external force is received.

The coordinate transforming section 31 transforms the new position instruction value P' into a robot coordinate. An executing section 351 executes the position instruction value P'. Consequently, it is possible to move the tool center point TCP to a position taking into account the force-derived correction amount $\Delta S$, relax a shock of the applied external force, and prevent a more load from being applied to a target object that touches the robot 1. As a result, work can be safely and stably performed.

In the robot system 100, such force control is performed during the direct teaching. Consequently, when the operator applies force to the stopped robot arm 10 to be in a desired position and a desired posture, it is possible to move the robot arm 10 to the desired position and the desired posture with as small a load as possible. Teaching can be safely performed.

The storing section 37 is configured by, for example, a volatile memory such as a RAM (Random Access Memory), a nonvolatile memory such as a ROM (Read Only Memory), or a detachable external storage device. In the storing section 37, an operation program for causing the robot 1 to operate, a teaching program for performing teaching, and the like are stored. In the storing section 37, calibration curves K1 to K4 explained below and the like are stored.

When teaching is performed, in particular, when the operator applies external force to the robot arm 10 in a state in which the robot arm 10 is stopped, it is hard for the operator to predict at which degree of speed the robot arm 10 operates if the robot arm 10 is pushed by which degree of force. That is, if the robot arm 10 once starts to move, the operator easily moves the robot arm 10 at desired speed but it is hard to predict operating speed of the robot arm 10 at an operation start time of the robot arm 10. Therefore, operability is low.

In view of such a problem, in the robot system 100, the problems can be solved by the restricting section 36. This is explained in detail below.

The restricting section 36 shown in FIG. 2 gradually relaxes, according to an elapsed time from when operation of the robot arm 10 is started or a movement amount of the robot arm 10 from when the operation of the robot arm 10 is started, a restrictive condition for restricting the driving of the robot arm 10. In the following explanation in this embodiment, the restricting section 36 gradually relaxes the restrictive condition according to the elapsed time from when the operation of the robot arm 10 is started.

The restrictive condition means a condition for restricting the operation of the robot arm 10 and means an upper limit value of speed, acceleration, force control parameters, or a target force of the robot arm 10. In the following explanation in this embodiment, the restricting section 36 relaxes the upper limit value of speed as the restrictive condition. In the following explanation, the speed means the speed of the tool center point TCP of the robot arm 10.

In a stop state of the robot arm 10, when the operator applies external force to the robot arm 10, the force detecting section 19 detects the external force, that is, an operation instruction. The control device 3 starts driving of the robot arm 10 based on a result of the detection. That is, movement of the robot arm 10 is started. When time of the start is represented as time T0, the restricting section 36 sets upper limit speed at the time T0 to V0. The restricting section 36 gradually relaxes, that is, gradually increases the upper limit speed from the time T0 until predetermined time Tx elapses. Consequently, even if operation for driving the robot arm 10 at the upper limit speed from the time T0 to time Tx, it is possible to allow operating speed of the robot arm 10 to only gradually increase. Accordingly, it is possible to sufficiently suppress initial speed and gradually relax the restrictive condition until predetermined time. Therefore, operability is excellent.

After the time Tx elapses, the upper limit speed is fixed at speed Vx. However, not only this, but the upper limit speed after the elapse of the time Tx may change.

It is determined based on a calibration curve indicating a relation between the upper limit speed and the time how the upper limit speed is relaxed until the time Tx. The calibration curve is stored in the storing section 37 in advance. Types of calibration curves are explained with reference to FIGS. 3 to 6.

Figure 3:
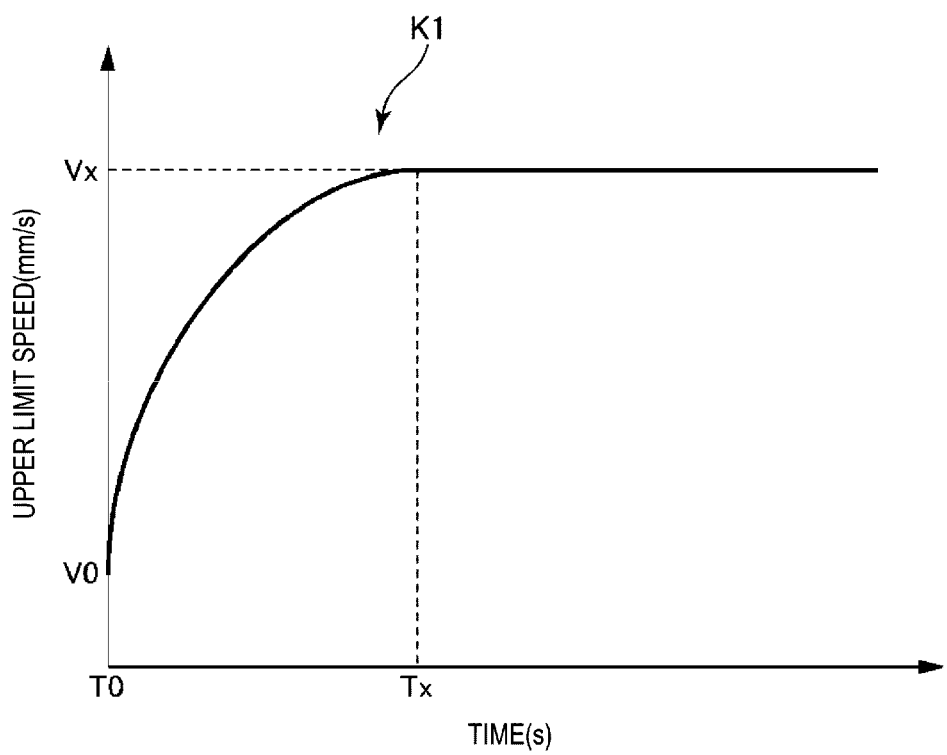
FIG. 3 is a graph for explaining an example of a calibration curve indicating relationship between upper limit speed of a robot arm and time.

The calibration curve K1 shown in FIG. 3 is a quadratic curve indicating that a rate of change, that is, a rate of increase of the upper limit speed continuously falls as the time elapses. That is, the rate of increase of the upper limit speed is relatively large immediately after a start of movement of the robot arm 10 but, when the time approaches the time Tx, the rate of increase of the upper limit speed becomes relatively small. By using such a calibration curve K1, the effect that the operability is excellent is obtained. In particular, the start of movement of the robot arm 10 is quickened and the upper limit speed smoothly changes when the time Tx elapses and the upper limit speed is fixed at the speed Vx. Consequently, when the time Tx elapses, it is possible to prevent or suppress the operability from being deteriorated.

In this way, when relaxing the upper limit speed, which is an example of the restrictive condition, the restricting section 36 gradually reduces a rate of change, that is, a rate of increase of a degree of the relaxing of the upper limit speed. Consequently, the start of movement of the robot arm 10 is quickened and it is possible to prevent or suppress the operability from being deteriorated near end time of the increase in the upper limit speed.

The calibration curve K2 is explained.

Figure 4:
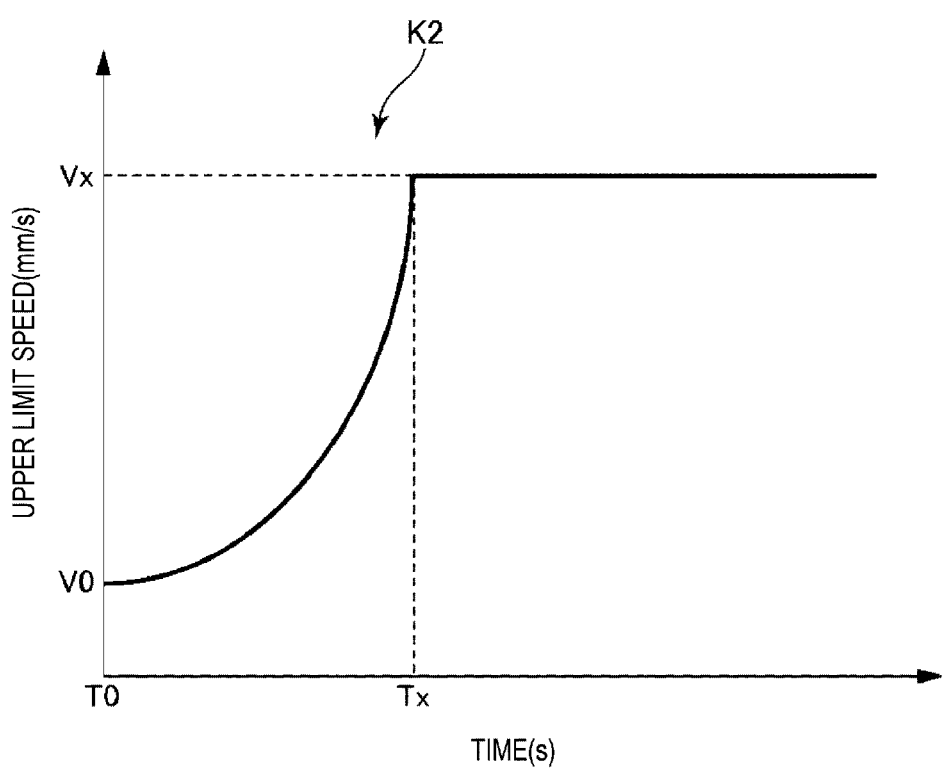
FIG. 4 is a graph for explaining an example of a calibration curve indicating relationship between the upper limit speed of the robot arm and the time.

The calibration curve K2 shown in FIG. 4 is a quadratic curve indicating that a rate of change, that is, a rate of increase of the upper limit speed continuously rises as the time elapses. That is, the rate of increase of the upper limit speed is relatively small immediately after a start of movement of the robot arm 10 but, when the time approaches the time Tx, the rate of increase of the upper limit speed becomes relatively large. By using such a calibration curve K2, the effect that the operability is excellent is obtained. In particular, since the rate of increase of the upper limit speed is small immediately after the start of movement of the robot arm 10, a smooth start of movement is possible. Accordingly, it is possible to further improve the operability immediately after the start of movement of the robot arm 10.

In this way, when relaxing the upper limit speed, which is an example of the restrictive condition, the restricting section 36 gradually increases a rate of change, that is, a rate of increase of a degree of relaxing of the upper limit speed. Consequently, it is possible to more surely improve the operability immediately after the start of movement of the robot arm 10.

The calibration curve K3 is explained.

Figure 5:
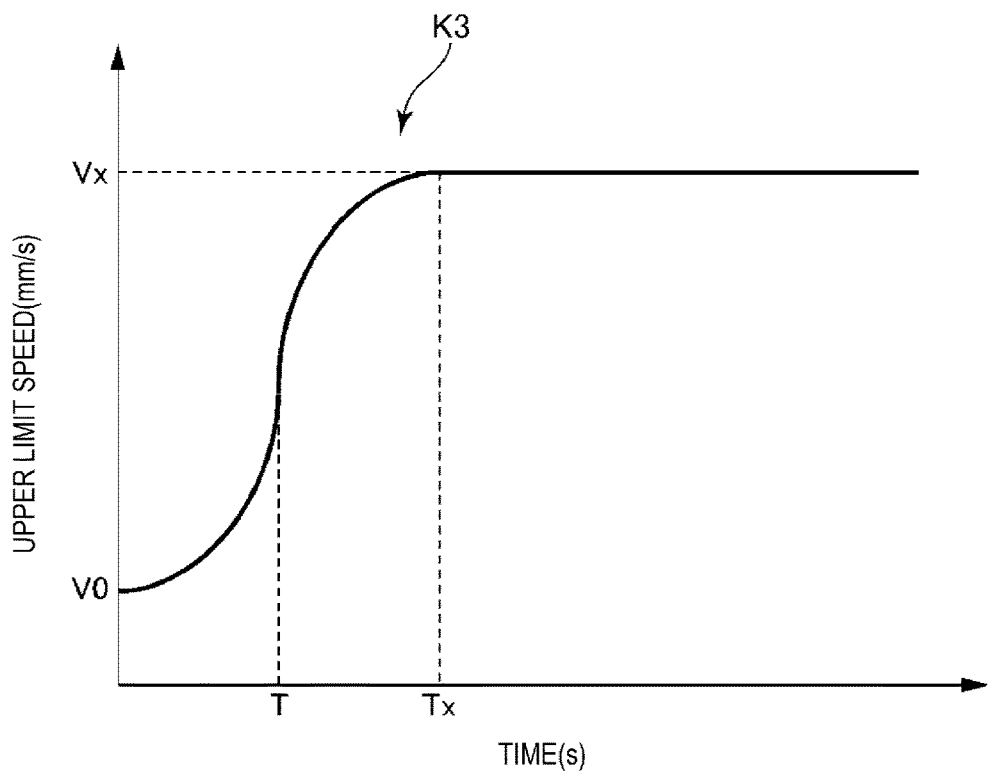
FIG. 5 is a graph for explaining an example of a calibration curve indicating relationship between the upper limit speed of the robot arm and the time.

The calibration curve K3 shown in FIG. 5 is a calibration curve indicating that a rate of change, that is, a rate of increase of the upper limit speed continuously rises until the time T and the rate of increase of the upper limit speed continuously falls from the time T until the time Tx. That is, the rate of increase of the upper limit speed is relatively small immediately after the start of movement of the robot arm 10 and the rate of increase of the upper limit speed becomes relatively small when the time Tx approaches. By using such a calibration curve K3, the effect that the operability is excellent is obtained. In particular, the start of movement of the robot arm 10 is smoothed. When the time Tx elapses and the upper limit speed is fixed at the speed Vx, the upper limit speed smoothly changes. Consequently, it is possible to further improve the operability immediately after the start of movement of the robot arm 10 and when the time Tx elapses.

In this way, when relaxing the upper limit speed, which is an example of the restrictive condition, the restricting section 36 gradually increases the rate of change in the degree of the relaxing of the upper limit speed until a predetermined time or up to a predetermined movement amount and gradually reduces the rate of change in the degree of the relaxing of the upper limit speed at the predetermined or subsequent time or the predetermined or larger movement amount. Consequently, it is possible to further improve the operability immediately after the start of movement of the robot arm 10 and at the time when the time Tx approaches.

The calibration curve K4 is explained.

Figure 6:
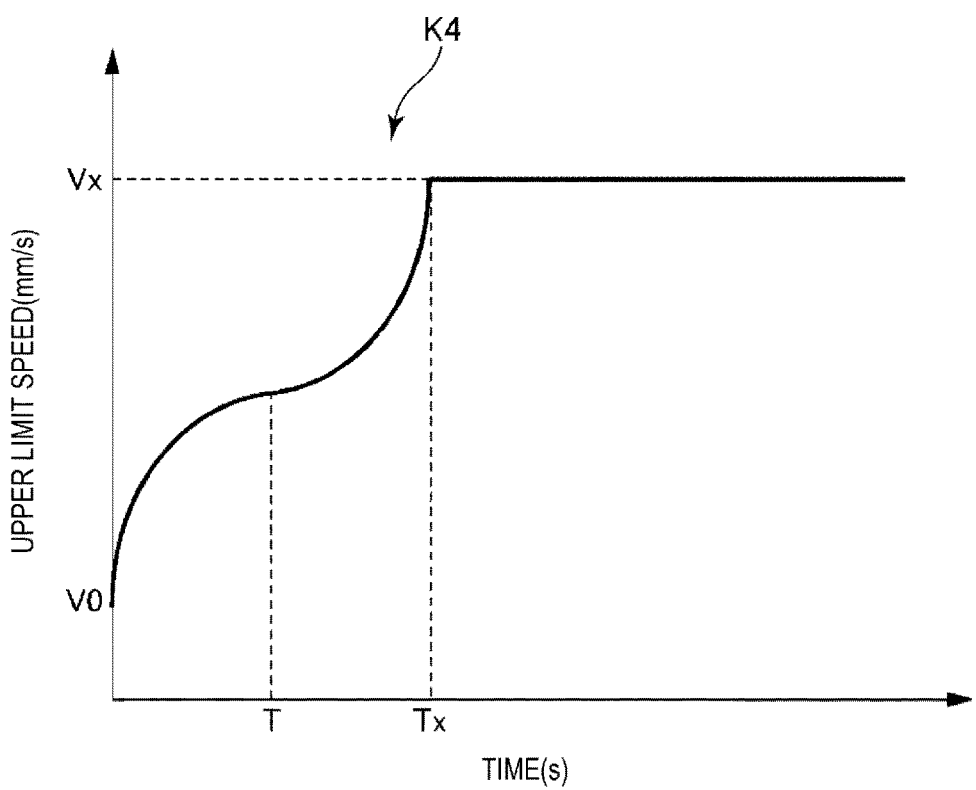
FIG. 6 is a graph for explaining an example of a calibration curve indicating relationship between the upper limit speed of the robot arm and the time.
Figure 7:
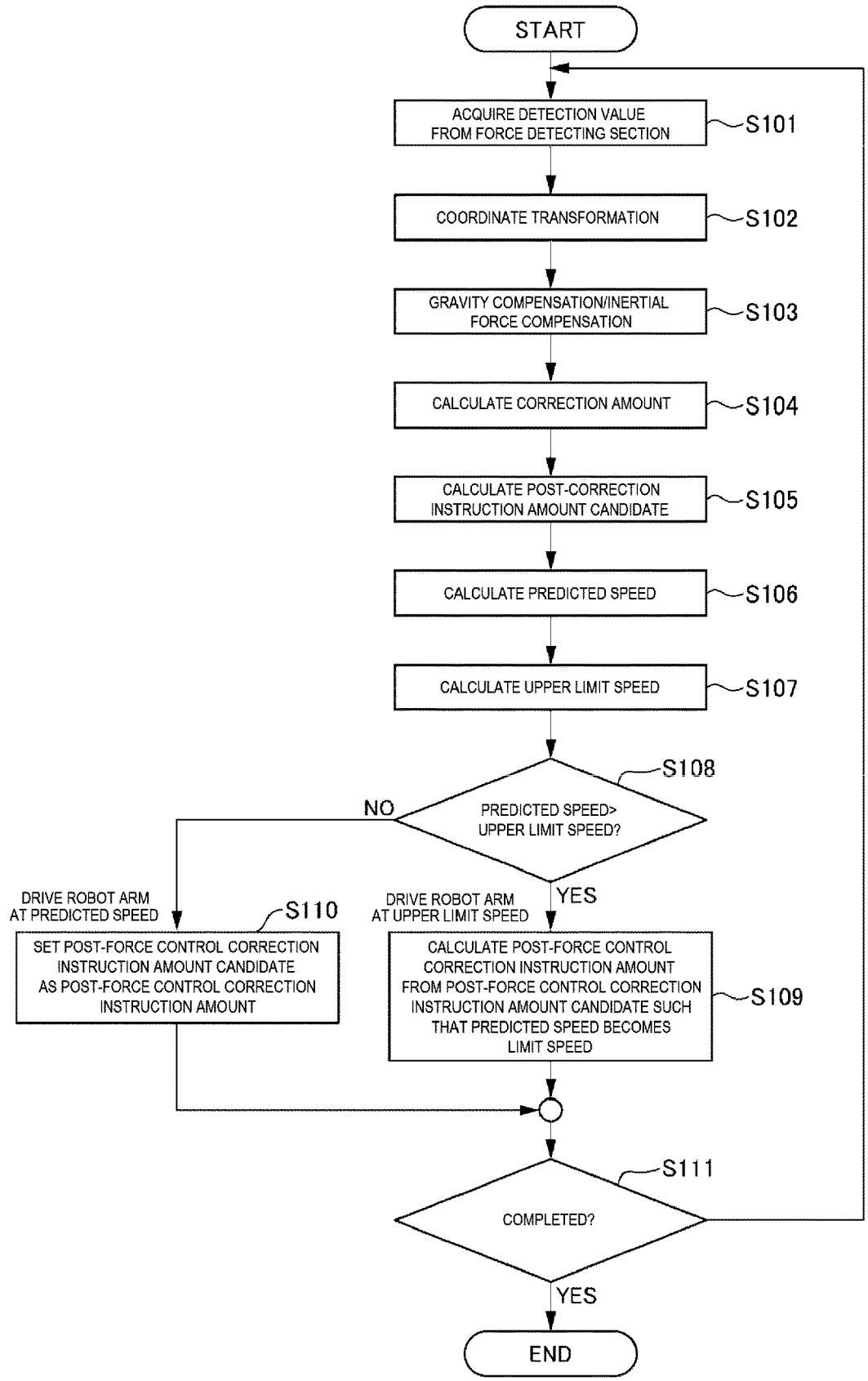
FIG. 7 is a flowchart for explaining a control operation performed by a control device shown in FIG. 2.

The calibration curve K4 shown in FIG. 6 is a quadratic curve indicating that a rate of change, that is, a rate of increase of the upper limit speed continuously falls until the time T and the rate of increase of the upper limit speed continuously rises from the time T until the time Tx. That is, the rate of increase of the upper limit speed is relatively large immediately after the start of movement of the robot arm 10, the rate of increase of the upper limit speed becomes relatively small near the time T, and the rate of increase of the upper limit speed is relatively large when the time Tx approaches. By using such a calibration curve K4, the effect that the operability is excellent is obtained. In particular, the start of movement of the robot arm 10 is quickened. The robot arm 10 smoothly moves near the intermediate time T. Consequently, it is possible to further improve the operability near the time T.

In this way, when relaxing the upper limit speed, which is an example of the restrictive condition, the restricting section 36 gradually reduces a rate of change in a degree of relaxing of the upper limit speed until a predetermined time or up to a predetermined movement amount and gradually increases the rate of change in the degree of relaxing of upper limit speed at the predetermined or subsequent time or the predetermined or larger movement amount. Consequently, it is possible to further improve the operability near the time T.

In this way, when relaxing the upper limit speed, which is an example of the restrictive condition, the restricting section 36 continuously relaxes the upper limit speed. Consequently, it is possible to stably exert excellent operability from immediately after the start of movement of the robot arm 10 until the time Tx.

In the above explanation, as an example of the continuous change, the upper limit speed changes in a form of the quadratic curve. However, the upper limit speed may linearly change. The change in the upper limit speed is not limited to the continuous change explained above and may be a step-by-step change. In the case of the step-by-step change, changes in a plurality of stages are included in the present disclosure.

The calibration curves K1 to K4 may be stored in the storing section 37 as relational expressions or may be stored in the storing section 37 as tables.

As explained above, the robot system 100 according to the present disclosure includes the robot including the robot arm 10, the force detecting section 19 that detects external force applied to the robot arm 10, the storing section 37 that stores the position and the posture of the robot arm 10, and the control device 3 functioning as the control section that drives the robot arm 10 with force control based on the external force and executes teaching for storing the position and the posture of the robot arm 10 in the storing section 37. The control device 3 gradually relaxes, according to an elapsed time from when the operation of the robot arm 10 is started or a movement amount of the robot arm 10 from when the operation of the robot arm 10 is started, the restrictive condition for restricting the driving of the robot arm 10. Consequently, it is possible to restrict the driving of the robot arm 10 from immediately after the start of movement of the robot arm 10. In particular, operability immediately after the start of movement of the robot arm 10 is excellent.

In the above explanation, the restrictive condition for the robot arm 10 is gradually relaxed according to the elapsed time from when the operation of the robot arm 10 is started. However, the present disclosure is not limited to this. The restrictive condition for the robot arm 10 may be gradually relaxed according to a movement amount of the robot arm 10 from when the operation of the robot arm 10 is started.

When the restrictive condition for the robot arm 10 is gradually relaxed according to the movement amount of the robot arm 10 from when the operation of the robot arm 10 is started, it is determined based on a calibration curve indicating a relation between the upper limit speed and the movement amount of the robot arm 10 how the upper limit speed is relaxed up to a predetermined movement amount. In a graph of the calibration curve in this case, the horizontal axis of the graphs of the calibration curves K1 to K4 indicating the time in FIGS. 3 to 6 indicates the movement amount.

In the above explanation, the speed of the robot arm 10 is explained as an example of the restrictive condition. However, the present disclosure is not limited to this. For example, the restrictive condition may be acceleration, at least one of the mass coefficient m, the viscosity coefficient d, and the modulus of elasticity k, which are the force control parameters, and the target force $f_{St}$. Two or more of these restrictive conditions may be gradually relaxed.

The teaching method according to the present disclosure is explained as an example of the control operation of the robot system 100 with reference to a flowchart of FIG. 7. In the following explanation, the explanation starts from a state in which the robot arm 10 is stopped in a teaching mode.

In the following explanation, as in the above explanation, the upper limit speed of the robot arm 10 is gradually relaxed according to the elapsed time from when the operation of the robot arm 10 is started.

First, in step S101, force applied to the robot 1 is detected and acquired. That is, the force detecting section 19 detects external force and acquires a detection value of the external force. Subsequently, in step S102, the force applied to the force detecting section 19 is coordinate-transformed. That is, the force actually acting on the force detecting section 19 is specified in the robot coordinate system and transformed into the acting force $f_S$ applied to the tool center point TCP.

In step S103, gravity compensation and inertial force compensation are performed on the acting force $f_S$. That is, components of force and torque due to the gravity and components of force and torque due to an inertial force are removed from the acting force $f_S$.

Subsequently, in step S104, the force-derived correction amount ΔS is calculated. The force-derived correction amount ΔS is calculated based on the acting force $f_S$, the force control parameters, and the target force $f_{St}$. That is, the acting force $f_S$, the force control parameters, and the target force $f_{St}$ are substituted in Expression (1) to calculate the force-derived correction amount ΔS.

Subsequently, in step S105, a post-correction instruction amount candidate is calculated. The post-correction instruction amount candidate is calculated by adding the force-derived correction amount ΔS to the position instruction value P.

Subsequently, in step S106, predicted speed is calculated. The predicted speed is calculated based on the post-correction instruction amount candidate.

Subsequently, in step S107, upper limit speed is calculated. The upper limit speed is calculated based on, for example, present time and any one of the calibration curves K1 to K4. As explained above, the calibration curves K1 to K4 are calibration curves for gradually relaxing, according to the elapsed time from when the operation of the robot arm 10 is started, the upper limit speed serving as the restrictive condition for restricting the driving of the robot arm 10.

Subsequently, in step S108, the predicted speed calculated in step S105 and the upper limit speed calculated in step S106 are compared. When determining in step S108 that the predicted speed is higher than the upper limit speed, processing of the teaching method shifts to step S109. When it is determined that the predicted speed is equal to or lower than the upper limit speed, the processing shifts to step S110.

In step S109, the robot arm 10 is driven at the upper limit speed. That is, the position instruction value P' for moving the tool center point TCP at the upper limit speed is calculated. The position instruction value P' is converted into position instruction values for the joints 171 to 176 and converted into final position instruction values corresponding to the motors M1 to M6 and executed.

In step S110, the robot arm 10 is driven at the predicted speed. That is, the position instruction value P' for moving the tool center point TCP at the predicted speed is calculated. The position instruction value P' is converted into position instruction values for the joints 171 to 176 and converted into final position instruction values corresponding to the motors M1 to M6 and executed.

Subsequently, in step S111, it is determined, based on whether the operator instructs teaching completion, whether the teaching is completed. When it is determined in step S111 that the teaching is not completed, the processing returns to step S101. Step S101 and subsequent steps are sequentially repeated.

As explained above, the teaching method according to the present disclosure is the teaching method for detecting external force applied to the robot arm 10, driving the robot arm 10 with force control based on the external force, and teaching the position and the posture of the robot arm 10. The restrictive condition for restricting the driving of the robot arm 10 is gradually relaxed according to an elapsed time from when the operation of the robot arm 10 is started or a movement amount of the robot arm 10 from when the operation of the robot arm 10 is started. Consequently, it is possible to restrict the driving of the robot arm 10 from immediately after the start of movement of the robot arm 10. In particular, operability immediately after the start of movement of the robot arm 10 is excellent.

When the restrictive condition is the upper limit value of the speed or the acceleration of the robot arm 10, the upper limit value is gradually increased when the restrictive condition is relaxed. Consequently, as explained above, it is possible to more directly improve the operability immediately after the start of movement of the robot arm 10.

When the robot arm 10 is driven by the force control and the restrictive condition is the upper limit value of the force control parameter or the target force, the upper limit value is gradually increased when the restrictive condition is relaxed. Consequently, the operator can feel, from the robot arm 10, a relatively large load immediately after the start of movement of the robot arm 10. Accordingly, it is possible to prevent or suppress force for pushing the robot arm 10 from becoming excessively large. As a result, it is possible to prevent or suppress the robot arm 10 from excessively quickly moving.

Another Configuration Example of the Robot System

Figure 8:
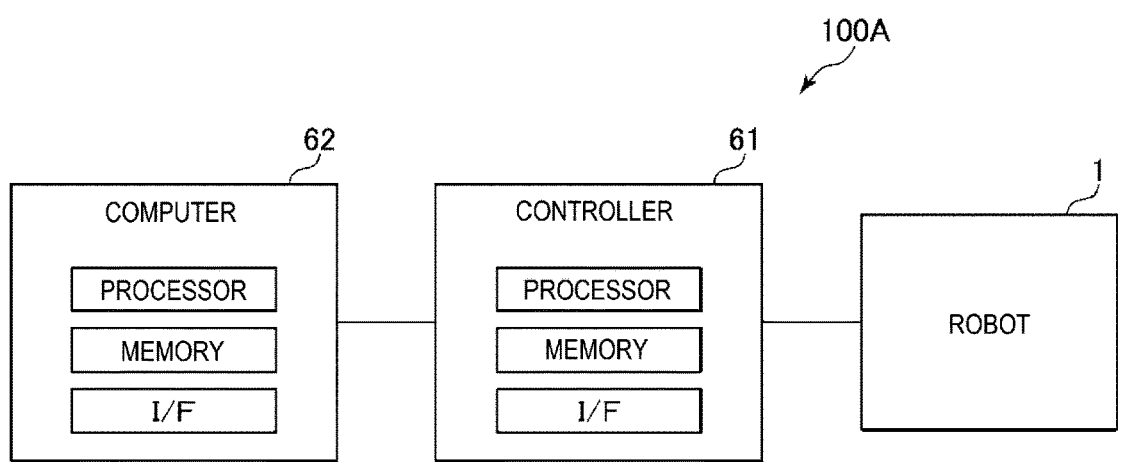
FIG. 8 is a block diagram for explaining the robot system centered on hardware.

FIG. 8 is a block diagram for explaining the robot system centered on hardware.

In FIG. 8, an overall configuration of a robot system 100A in which the robot 1, a controller 61, and a computer 62 are coupled is shown. Control of the robot 1 may be executed by reading out an instruction stored in a memory with a processor present in the controller 61 or may be executed via the controller 61 by reading out the instruction stored in the memory with a processor present in the computer 62.

Therefore, one or both of the controller 61 and the computer 62 can be grasped as the "control device".

Modification 1

Figure 9:
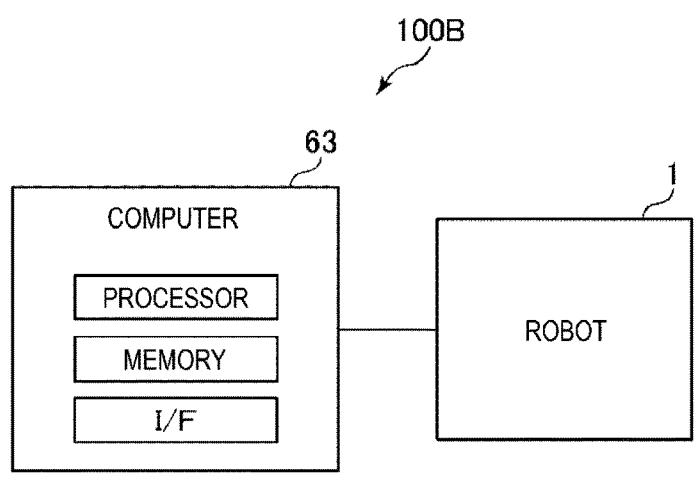
FIG. 9 is a block diagram showing a modification 1 centered on hardware of a robot system.

FIG. 9 is a block diagram showing a modification 1 centered on hardware of a robot system.

In FIG. 9, an overall configuration of a robot system 100B in which a computer 63 is directly coupled to the robot 1 is shown. Control of the robot 1 is directly executed by reading out an instruction stored in a memory with a processor present in the computer 63.

Therefore, the computer 63 can be grasped as the "control device".

Modification 2

Figure 10:
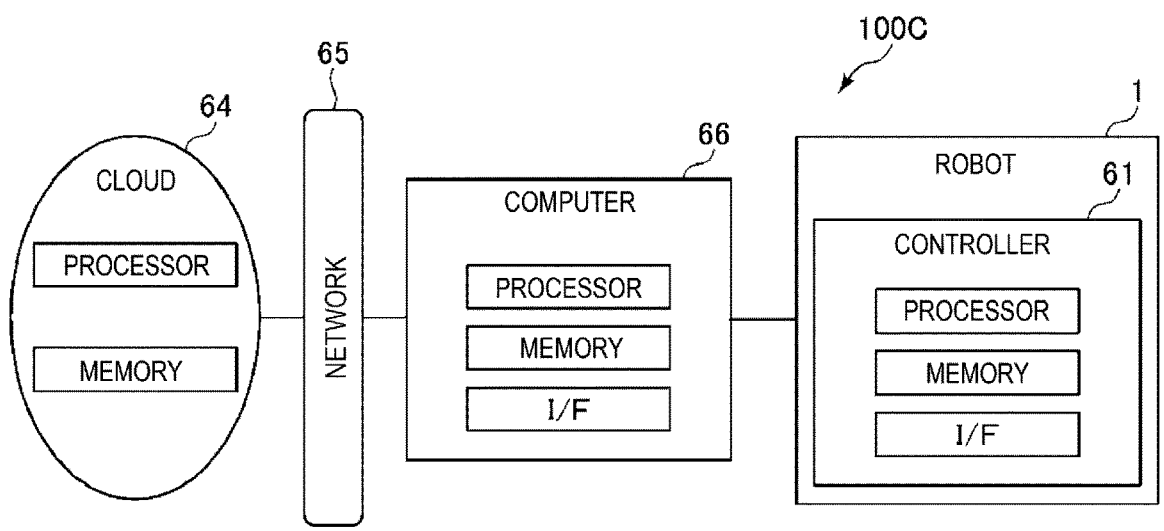
FIG. 10 is a block diagram showing a modification 2 centered on hardware of a robot system.

FIG. 10 is a block diagram showing a modification 2 centered on hardware of a robot system.

In FIG. 10, an overall configuration of a robot system 100C in which the robot 1 incorporating the controller 61 and a computer 66 are coupled and the computer 66 is coupled to cloud 64 via a network 65 such as a LAN is shown. Control of the robot 1 may be executed by reading out an instruction stored in a memory with a processor present in the computer 66 or may be executed by reading out the instruction stored in the memory with a processor present on the cloud 64 via the computer 66.

Therefore, any one, any two, or three of the controller 61, the computer 66, and the cloud 64 can be grasped as the "control device".

The teaching method and the robot system according to the present disclosure are explained about the illustrated embodiment. However, the present disclosure is not limited to the embodiment. The sections configuring the robot system can be replaced with any components that can exert the same functions. Any components may be added to the robot system.

What is claimed is:

1. A teaching method for detecting external force applied to a robot arm, driving the robot arm with force control based on the external force, and teaching a position and a posture of the robot arm, the teaching method comprising gradually relaxing, according to an elapsed time from when operation of the robot arm is started or a movement amount of the robot arm from when the operation of the robot arm is started, a restrictive condition for restricting the driving of the robot arm, wherein
when the restrictive condition is relaxed, a rate of change in a degree of the relaxing of the restrictive condition is gradually reduced until, a predetermined time or up to a predetermined movement amount and is gradually increased at the predetermined or subsequent time or the predetermined or larger movement amount.

2. The teaching method according to claim 1, wherein the restrictive condition is an upper limit value of speed or acceleration of the robot arm.

3. The teaching method according to claim 1, wherein, the restrictive condition is an upper limit value of force control parameters, or a target force of the robot arm.

4. A robot system comprising:
a robot including a robot arm;
a force sensor configured to detect external force applied to the robot arm;
a memory configured to store a position and a posture of the robot arm; and
a processor configured to drive the robot arm with force control based on the external force and execute teaching for storing the position and the posture of the robot arm in the memory, wherein
the processor gradually relaxes, according to an elapsed time from when operation of the robot arm is started or a movement amount of the robot arm from when the operation of the robot arm is started, a restrictive condition for restricting the driving of the robot arm, wherein
when the restrictive condition is relaxed, a rate of change in a degree of the relaxing of the restrictive condition is gradually reduced until a predetermined time or up to a predetermined movement amount and is gradually increased at the predetermined or subsequent time or the predetermined or larger movement amount.

* * * * *